Dec. 29, 1970  R. SELNES  3,550,277
EQUIPMENT FOR OPTICAL MEASUREMENT OF THE CHASSIS OF A VEHICLE
Filed March 6, 1968
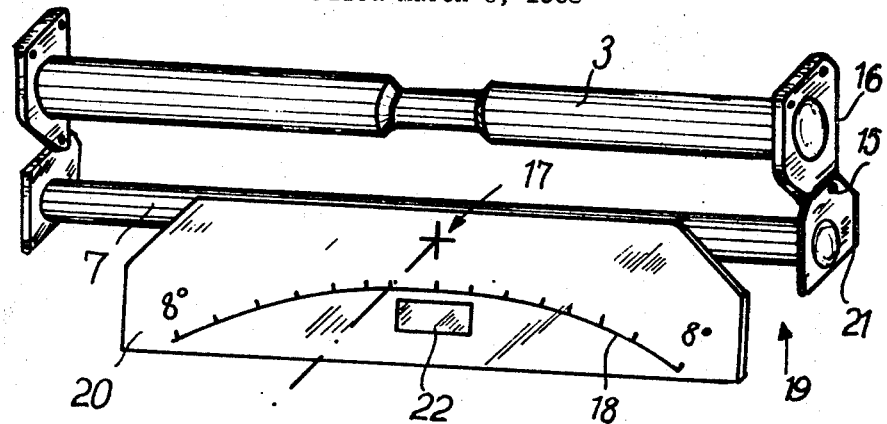
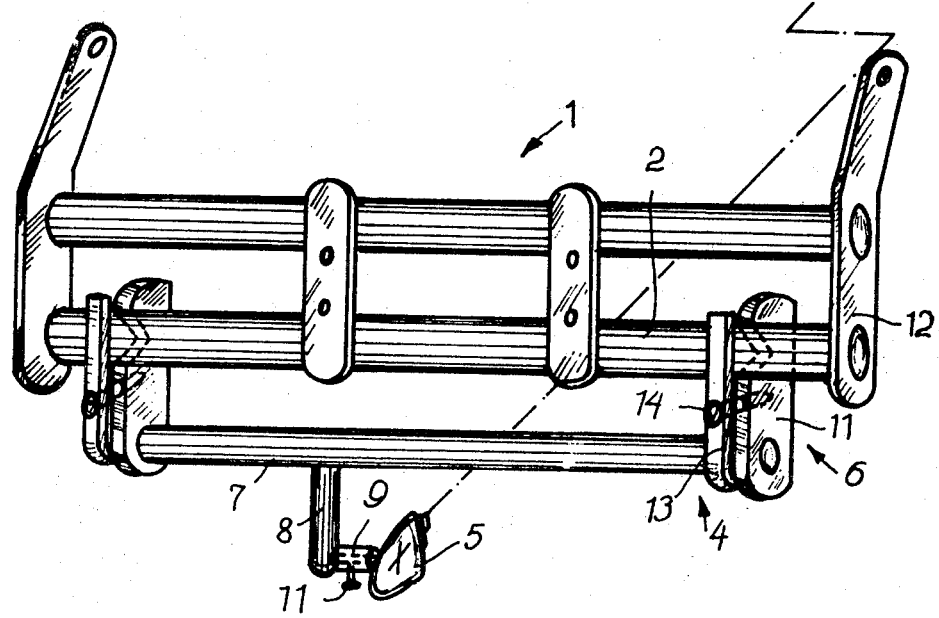
INVENTOR.
Roald Selnes United States Patent Office 3,550,277
Patented Dec. 29, 1970

3,550,277
EQUIPMENT FOR OPTICAL MEASUREMENT OF
THE CHASSIS OF A VEHICLE
Roald Selnes, Hotvetveien 160, Drammen, Norway
Filed Mar. 6, 1968, Ser. No. 711,097
Claims priority, application Norway, Mar. 8, 1967,
167,178
Int. Cl. G01c 15/00
U.S. Cl. 33—46                                          2 Claims

ABSTRACT OF THE DISCLOSURE

Method and means for an optical measurement of the chassis of a vehicle employing two pairs of fixed points located in pairs on the vertical symmetry plane of the chassis, namely a fore pair and a rear pair of points to which are respectively attached a projector and a measuring board, the center of the projector and measuring board being located directly between the points in the respective pairs of points or equally displaced from said center positions. On projecting recording symbols on the board which is provided with corresponding recording symbols, the projected and fixed recording symbols will be aligned or divergent according to the state of the chassis.

---

The present invention relates to a method for the optical measurement of the chassis of a vehicle in order to determine whether or not the vehicle is distorted, or to establish the degree of distortion of a vehicle which has been involved in an accident, as well as for use in the actual alignment process of a distorted chassis.

In order to determine a distortion of a vehicle's chassis, it has previously been customary to use a measuring tape to measure the distance between two points on one side of the vehicle, and the distance between two corresponding points on the other side of the vehicle, to ascertain the distortion of the plane of the frame when there is a possibility of contraction or extension between two points on the same side of the vehicle in comparison with the two corresponding points on the other side of the vehicle. It is possible to employ this simple method in connection with torsional deformations of the vehicle's chassis or frame, and it has been necessary to depend on sighting in two lines transversely of the chassis or frame, with the lines being normally parallel, and to determine the distortion on the basis of the differing directions of the lines. These sighting lines may comprise transverse stays in the chasis or frame or may be laid on transverse straight edged members supported or constructed at fixed points to facilitate the sighting operation.

The object of the present invention is to provide a method and simple means for measuring the chassis or frame of a vehicle, the means being simple to use, rapid of execution and of a simple, strong and inexpensive construction, so that it may be readily available to personnel concerned with the alignment of vehicles which have been subjected to various forms of rough treatment.

Generally speaking the invention comprehends locating a fore pair and a rear pair of fixed points on the chassis of a vehicle for optical measurement on the vertical symmetry plane of the chassis, attaching a projector and a measuring board to the fore pair and rear pair respectively, with the center of the projector and measuring board being located directly betwen the points or equally displaced from the center whereby the projector projects recording symbols on the measuring board having corresponding recording symbols and with the projected and fixed recording symbol being aligned or divergent respectively according to whether the chassis is straight or distorted.

By means of this invention when measuring the chassis, it is possible to determine whether the chassis is straight or distorted, twisted, contracted or extended, respectively, by means of the relative sightings between the recording symbols on the measuring board and the projected recording symbols from the projector.

By means of the present invention a much simpler and more rapid alignment of a chassis is achieved when using a hydraulic alignment equipment, since the various parts may be pressed together or apart, or eventually twisted, while at the same time, full control of the operation is maintained by determining the relative positions of the recording symbols on the measuring board.

For certain types of vehicles, a special securing device has been provided for the projector and measuring board respectively, in that the securing device used on the fore part of the chassis may be attached to a transverse torsion bar casing in the fore carriage by clamping means at each end of an intermediate piece upon which the projector is mounted, and that the measuring board is also mounted on an intermediate piece, may be attached to the rear flanges on a rear torsion bar casing which is fixed relative to the actual chassis. A relatively expensive and complex jig has been generally used for this special type of vehicle and the service of several men is required with the said jig for the alignment of damaged chassis and for posible replacement of parts in the chassis, for example, the fore carriage head.

By means of the novel method and means of the invention, the use of such a heavy and complex jig is avoided, since the replacement of a e.g. fore carriage head this may merely be screwed fast and eventually straightened and secured by means of clamps, after which it is welded to the chassis.

Further objects and advantages of the present invention will become more readily apparent to persons skilled in the art from the following detailed description and annexed drawing in which the sole figure is a diagrammatic perspective view illustrating parts of the chassis of a special type of vehicle where, as fixed pairs of points, a transverse, fore torsion bar casing and a rear, transverse torsion bar casing are selected, upon which casings one embodiment of the securing devices, with a projector and measuring board, are mounted.

As illustrated in the drawings, there is provided a front carriage 1 having a torsion bar casing 2 to which a projector 5 is operably related. The projector 5 is attached to an intermediate piece 7 by means of a bracket 8, a casing 9 disposed in parallelism to the piece 7 and a set screw 10. The intermediate piece 7 is secured to the torsion bar casing 2 by a securing device denoted generally 4 located adjacent each end of the intermediate piece 7. The device 4 includes a clamp 6 defined by a plate shaped member 11 and a second member 13. The member 11 is attached to the end of the intermediate piece 7 and is provided with a V-shaped or semicircular groove or notch 12 for partly embracing the torsion bar casing 2 for fixing the position of the clamp thereon. The member 13 is brought to bear with one end thereof against the number 11 by means of a screw element 14. The other end of the member 13 is pressed against the torsion bar casing 2 which is thus clamped between the members 11 and 13 in the groove 12.

It should be pointed out that care must be exercised during mounting of the securing device 4 so that the device is located at an equal distance from the ends of the torsion bar casing 2 so that the projector 5 with its recording symbol is located in a longitudinal vertical symmetry plane of the chassis provided this is not deformed. The ends of the torsion bar casing 2 define the fore pair of points.

A rear transversely disposed torsion bar casing 3 is operably associated with the rear wheel suspenion of the vehicle and supports a measuring board 20. The measuring board 20 is mounted on an intermediate piece 7' which is attached at each end thereof to the torsion bar casing 3 by a securing device 19. More particularly, a plate 21 is located at each end of the intermediate piece 7' and the plate is provided with a least one aperture 15 whereby the plate may be tightly affixed to an end flange 16 of the torsion bar casing 3 by means of a bolt. The apertures 15 constitute the rear pair of points. The measuring board 20 is provided with cross hairs 17, a curve line 18 and a mirror 22.

The above described securing devices 4 and 19 must obviously be adapted to the various types of vehicles, with the most important feature being to select two pairs of points, one pair at the fore portion and one pair at the rear portion of the chassis which are suitable for attachment points or reference points for measuring the chassis.

When the members of the measuring equipment, projector and measuring board are mounted on the chassis by means of the securing devices 4 and 19, and the projector 5 is so adjusted that the horizontal part of the cross hairs in the projector is of the same height on the measuring board 20 as the corresponding part of cross hairs 17 thereon, it is possible to determine whether the chassis is straight or distorted. If the projected cross hairs is in alignment with the cross hairs 17 on the measuring board 20, and a projected, graded curve is in alignment with the corresponding curve 18 on the measuring board 20, the chassis is straight. If the cross hairs and curve are projected to the right or left respectively, but at the same height as the corresponding recording symbols on the measuring board 20, a distortion is indicated, showing that the distance between the two fixed points on the same side of the chassis is either increased or decreased due to external strain, for example, a collision. If the projected curve is in alignment with the curve 18 on the measuring board 20, but it displaced a number of degrees there along, twisting of the chassis only is indicated, and if, at the same time, the projected curve is not in complete alignment with the curve 18, a combination of twisting and relative displacement of the fixed points is indicated.

During the alignment operation of the chassis, the measuring equipment may be used as a continual check of the work in progress, for example, when a twisting, contraction or extension of the various parts of the chassis is to be corrected.

In order to be able to the use securing device 19 in connection with torsion bar casings of less length, spacer casings may be used which are adapted to be inserted into the screw bolt connecting the flange plate 16 with end plate 21. Casings on either side to provide correct positioning of the measuring board 20 are then obviously necessary.

The means and method, as is also stated in the introductory part of the description, may also be used in connection with replacement of parts of a chassis, whereby the use of heavy and unwieldy jigs to ensure correct positioning between the chassis and the part to be replaced, is avoided.

An even simpler and more precise control of the relative positions of the securing devices 4 and 19, and thereby the positions of the attachment points, is achieved by mounting the mirror 22 on the center portion of the measuring board 20, which, on adjustment of the projector 5, will reflect the projected cross hairs to a transverse grade scale mounted on the front of the projector 5, whereby the position of the reflected cross hairs on the grade scale indicates whether the securing-devices 4 and 19 are parallel or distorted by reason of possible distortions in the vehicle. By means of the mirror 22 and the reflection of the projected cross hairs back to the projector 5, it is possible to discover even very slight distortions and adjust the defects.

In vehicles of the particular type mentioned previously, in which a plane through the parallel for torsion bar casings 2 which are disposed transversely of the vehicle and one above the other, such vehicles may be checked as follows; The intermediate piece 7 of the securing device 4 is brought into plane with the fore torsion bar casings 2 by means of a straight edge member laid over the two torsion bar casings, whereby a previously adjusted projector 5 will project the cross hairs on to the measuring board 20 where the position thereof, relative to a vertically extended grade scale or other suitable symbol, indicates a correct or incorrect castor angle. The symbols may be fixed symbols for the various models of vehicles, which are of various constructions and thereby various inclinations of the fore carriage chassis.

Having described my invention, I claim:

1. Means for the optical measurement of the chassis of a vehicle having a fore pair and a rear pair of fixed points locatable in pairs on a vertical symmetry plane of the chassis, including a projector, a first securing device for attaching the projector to the chassis at said fore pair, a measuring board, a second securing device for attaching said measuring board to the chassis at said rear pair, the center of the projector and measuring board being located directly betwen the points in the fore pair and rear pair or equally displaced from the center positions, so that the projector can project recording symbols on the measuring board, said measuring board having corresponding recording symbols thereon, with the projected and fixed recording symbols being aligned or divergent respectively, according to whether the vehicle chassis is straight or distorted, each securing device comprising an intermediate piece upon which the projector and measuring board respectively are attached, and two attachment members therefor whereby the vertical symmetry plane of the recording symbols recorded thereon is aligned with a center vertical plane between said attachment members or is equally displaced from said plane, a torsion bar casing defining said fore pair at the ends thereof, the attachment members of the first securing device being defined by two clamp parts, one of the clamp parts being attached to the intermediate piece and provided with a recess therein for partially enclosing said torsion bar casing, and a screw device operably related to the other clamp part and said one clamp part for urging such parts together to fix the clamp parts relative to the torsion bar casing.

2. The means for the optical measuring of the chassis of a vehicle having a fore pair and a rear pair of fixed points locatable in pairs on a vertical symmetry plane of the chassis, including a projector, a first securing device for attaching the projector to the chassis at said pair, a measuring board, a second securing device for attaching said measuring board to the chassis at said rear pair, the center of the projector and measuring board being located directly between the points in the fore pair and rear pair or equally displaced from the center positions, so that the projector can project recording symbols on the measuring board said measuring board having corresponding recording symbols thereon, with the projected and fixed recording symbols being aligned or divergent respectively, according to whether the vehicle chassis is straight or distorted, each securing device comprising an intermediate piece upon which the projector and measuring board respectively are attached, and two attachment members therefor whereby the vertical symmetry plane of the recording symbols recorded thereon is aligned with a center vertical plane between said attachment members or is equally displaced from said plane, a rear torsion bar casing, the attachment members of the second securing device comprising two plates, one plate being located at each end of said intermediate piece, each plate being provided with at least one aperture, and screw bolts lodged in said apertures for attaching the intermediate piece to said rear torsion bar casing with said apertures defining said pair.

References Cited

UNITED STATES PATENTS

| | | | |
|---|---|---|---|
| 3,398,453 | 8/1968 | Hurst | 33—46 |
| 3,337,961 | 8/1967 | Holub | 33—203.18 |
| 3,279,070 | 10/1966 | Blunt et al. | 33—46 |
| 3,188,741 | 6/1965 | Jeansson et al. | 33—46 |
| 3,029,515 | 4/1962 | Marteil | 33—46 |
| 2,780,875 | 2/1957 | Carr | 33—203.18 |
| 2,249,226 | 7/1941 | Peters | 33—46 |
| 1,822,599 | 9/1931 | Monk | 33—193 |
| 2,000,866 | 5/1935 | Smith | 33—193 |
| 2,070,518 | 2/1937 | Smith | 33—191 |
| 3,057,074 | 10/1962 | Sidwell | 33—191 |

WILLIAM D. MARTIN, JR., Primary Examiner

U.S. Cl. X.R.

33—193, 203.18